United States Patent
Lee (10) Patent No.: US 10,760,666 B2
(45) Date of Patent: Sep. 1, 2020

(54) REDUCER OF ELECTRIC POWER STEERING DEVICE

(71) Applicant: MANDO CORPORATION, Gyeonggi-do (KR)

(72) Inventor: Kyung Tack Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 153 days.

(21) Appl. No.: 15/717,902

(22) Filed: Sep. 27, 2017

(65) Prior Publication Data
US 2018/0094716 A1 Apr. 5, 2018

(30) Foreign Application Priority Data
Oct. 5, 2016 (KR) .................... 10-2016-0128180

(51) Int. Cl.
*B62D 5/24* (2006.01)
*F16H 57/021* (2012.01)
*B62D 5/04* (2006.01)
*B62D 5/00* (2006.01)
(Continued)

(52) U.S. Cl.
CPC .......... *F16H 57/021* (2013.01); *B62D 5/008* (2013.01); *B62D 5/0409* (2013.01); *B62D 5/0445* (2013.01); *F16H 1/16* (2013.01); *F16H 57/039* (2013.01); *F16H 2057/0213* (2013.01)

(58) Field of Classification Search
CPC ...... F16H 55/24; F16H 57/021; F16H 57/039; F16H 2057/0213; F16H 55/28; B62D 3/123; B62D 5/24; F16F 9/3405
See application file for complete search history.

(56) References Cited

U.S. PATENT DOCUMENTS

2001/0054529 A1* 12/2001 Wendt .................... F16F 9/532
188/322.13
2007/0125193 A1* 6/2007 Augustine ............... F16H 55/24
74/339
(Continued)

FOREIGN PATENT DOCUMENTS

CN 104340263 2/2015
KR 10-2012-0057036 6/2012
KR 1020120057036 * 6/2012 ............... B62D 5/04

OTHER PUBLICATIONS

Office Action dated Aug. 26, 2019 for Chinese Patent Application No. 201710911456.7 and its English translation by Google Translate.

*Primary Examiner* — Randell J Krug
(74) *Attorney, Agent, or Firm* — Ladas & Parry, LLP (57) ABSTRACT

The present embodiments relates to a reducer of an electric power steering device. An embodiment of the present embodiments provides a reducer of an electric power steering device, including: a worm shaft having a first worm shaft bearing and a second worm shaft bearing coupled to one end portion, which is connected to a motor shaft, and to the other end portion, which is opposite thereto, respectively; a gear housing that contains the first worm shaft bearing, the second worm shaft bearing, and the worm shaft; and a support member coupled to the inner peripheral surface of the hear housing so as to support the outer race of the second worm shaft toward the worm wheel and filled with a viscoelastic fluid.

11 Claims, 7 Drawing Sheets

(51) Int. Cl.
*F16H 1/16* (2006.01)
*F16H 57/039* (2012.01)

(56) References Cited

U.S. PATENT DOCUMENTS

| | | | |
|---|---|---|---|
| 2012/0186378 A1* | 7/2012 | Bareis | B62D 3/123 74/396 |
| 2014/0352467 A1* | 12/2014 | Kwon | F16H 1/26 74/400 |
| 2015/0059506 A1* | 3/2015 | Kwon | F16H 1/16 74/425 |

* cited by examiner

FIG.1

RELATED ART

FIG.2

RELATED ART

REDUCER OF ELECTRIC POWER STEERING DEVICE

CROSS REFERENCE TO RELATED APPLICATION

This application claims priority from Korean Patent Application No. 10-2016-0128180, filed on Oct. 5, 2016, which is hereby incorporated by reference for all purposes as if fully set forth herein.

BACKGROUND OF THE INVENTION

1. Field of the Invention

The present embodiments relate to a reducer of an electronic power steering device. More particularly, the present embodiments relate to a reducer of an electronic power steering device, wherein any clearance resulting from wear of the worm and the worm wheel is prevented, rattle noise resulting from impacts transferred from the road surface is reduced, and the amount of change of clearance resulting from a change in rotational torque is minimized, thereby accurately assisting the driver's steering wheel operating force.

2. Description of the Prior Art

In general, the reducer of an electric power steering device controls driving of the motor by means of an electronic control device provided in the vehicle according to the vehicle's traveling condition, adds the rotational force of the worm shaft resulting from driving of the motor to the rotational force of the steering wheel operated by the driver, and transfers the same to the steering wheel, thereby maintaining the driver's steering/driving condition smoothly and stably.

However, such a reducer of an electric power steering device has a problem in that noise may be generated by a clearance resulting from a long use and following wear of the worm and the worm wheel, which are rotated by driving of the motor, or noise may be generated by a change in clearance resulting from absorption of moisture by the worm wheel.

There is another problem in that noise may be generated by impact sounds, which are transferred from the road surface through the wheels and the steering shaft, and by backlash of the worm and the worm wheel.

There is still another problem in that, due to the above-mentioned problems, it is impossible to accurately provide steering assist force that assists the driver's steering wheel operating force.

SUMMARY OF THE INVENTION

In this background, an aspect of the present embodiments is to provide to a reducer of an electronic power steering device, wherein any clearance resulting from wear of the worm and the worm wheel or resulting from absorption of moisture by the worm wheel is prevented, rattle noise resulting from impacts transferred from the road surface is reduced, and the amount of change of clearance resulting from a change in rotational torque is minimized, thereby accurately assisting the driver's steering wheel operating force.

Furthermore, the aspect of the present embodiments is not limited thereto, and other unmentioned aspects of the present embodiments may be clearly appreciated by those skilled in the art from the following descriptions.

In accordance with an aspect of the present embodiments, there is provided a reducer of an electric power steering device, including: a worm shaft having a first worm shaft bearing and a second worm shaft bearing coupled to one end portion, which is connected to a motor shaft, and to the other end portion, which is opposite thereto, respectively; a gear housing that contains the first worm shaft bearing, the second worm shaft bearing, and the worm shaft; and a support member coupled to the gear housing so as to support the second worm shaft bearing toward a worm wheel and filled with a viscoelastic fluid.

The present embodiments, described above, are advantageous in that, in connection with a reducer of an electronic power steering device, any clearance resulting from wear of the worm and the worm wheel is prevented, rattle noise resulting from impacts transferred from the road surface is reduced, and the amount of change of clearance resulting from a change in rotational torque is minimized, thereby accurately assisting the driver's steering wheel operating force.

BRIEF DESCRIPTION OF THE DRAWINGS

The above and other objects, features and advantages of the present embodiments will be more apparent from the following detailed description taken in conjunction with the accompanying drawings, in which.

DETAILED DESCRIPTION OF THE EXEMPLARY EMBODIMENTS

Hereinafter, embodiments of the present embodiments will be described in detail with reference to the accompanying drawings. In adding reference numerals to elements in each drawing, the same elements will be designated by the same reference numerals, if possible, although they are shown in different drawings. Further, in the following description of the present embodiments, a detailed description of known functions and configurations incorporated herein will be omitted when it is determined that the description may make the subject matter of the present embodiments rather unclear.

In addition, terms, such as first, second, A, B, (a), (b) or the like may be used herein when describing components of the present embodiments. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
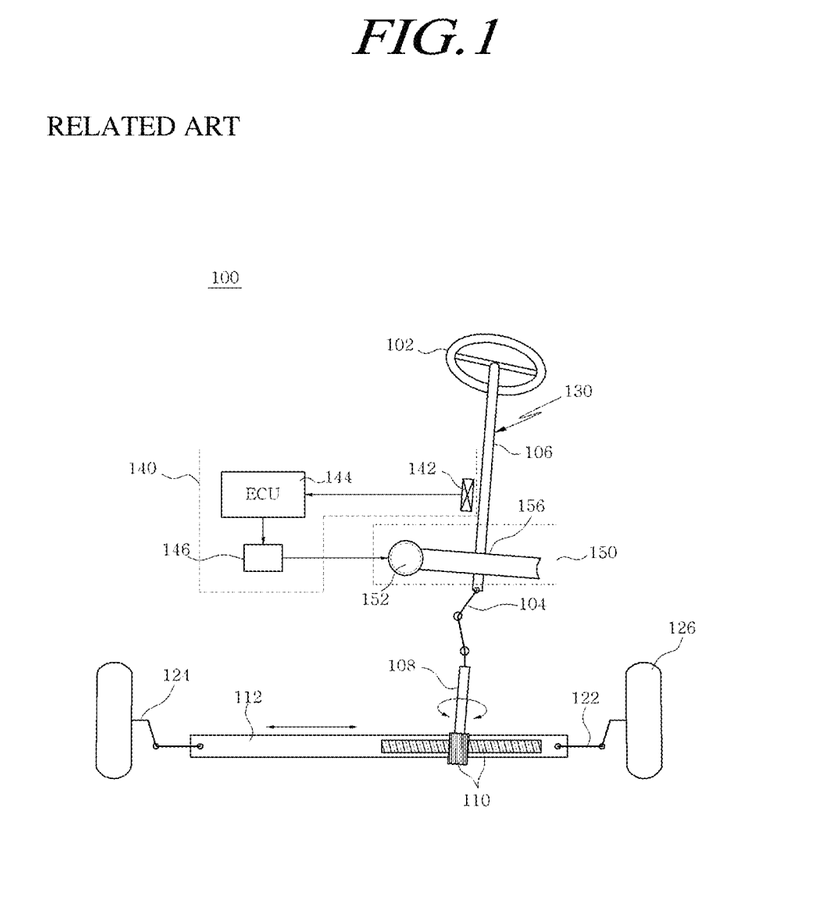
FIG. 1 illustrates a configuration of an electric power steering device.

FIG. 1 illustrates a configuration of an electric power steering device. As illustrated in FIG. 1, the electric power steering device 100 includes a steering system 130 ranging from a steering wheel 102 to both wheels 126 and an assist power mechanism 140 that provides the steering system 130 with steering assist power.

The steering system 130 includes a steering shaft 106 having one side connected to the steering wheel 102 so as to rotate together with the steering wheel 102 and having the other side connected to a pinion shaft 108 via a pair of universal joints 104. The pinion shaft 108 is connected to a rack bar 112 via a rack-pinion mechanism portion 110, and both ends of the rack bar 112 are connected to the wheels 126 of the vehicle via tie rods 122 and knuckle arms 124, respectively.

The assist power mechanism 140 includes a torque sensor 142 that senses a torque applied to the steering wheel 102 and outputs an electric signal in proportion to the sensed torque; an electronic control device 144 that generates a control signal on the basis of the electric signal from the torque sensor 142; a motor 146 that generates assist power on the basis of the control signal from the electronic control device 144; and a reducer 150 having a worm 152 and a worm wheel 156 so as to transfer assist power, which is generated by the motor 146, to the steering shaft 106.

Therefore, the electric power steering device is configured such that a torque generated by a rotation of the steering wheel 102 is transferred to the rack bar 112 via the rack-pinion mechanism portion 110, and assist power generated by the motor 146 is transferred to the rack bar 112 according to the generated torque.

In other words, the torque generated by the rotation of the steering wheel 102 and the assist power generated by the motor 146 are combined and cause the rack bar 112 to move in the axial direction.

Figure 2:
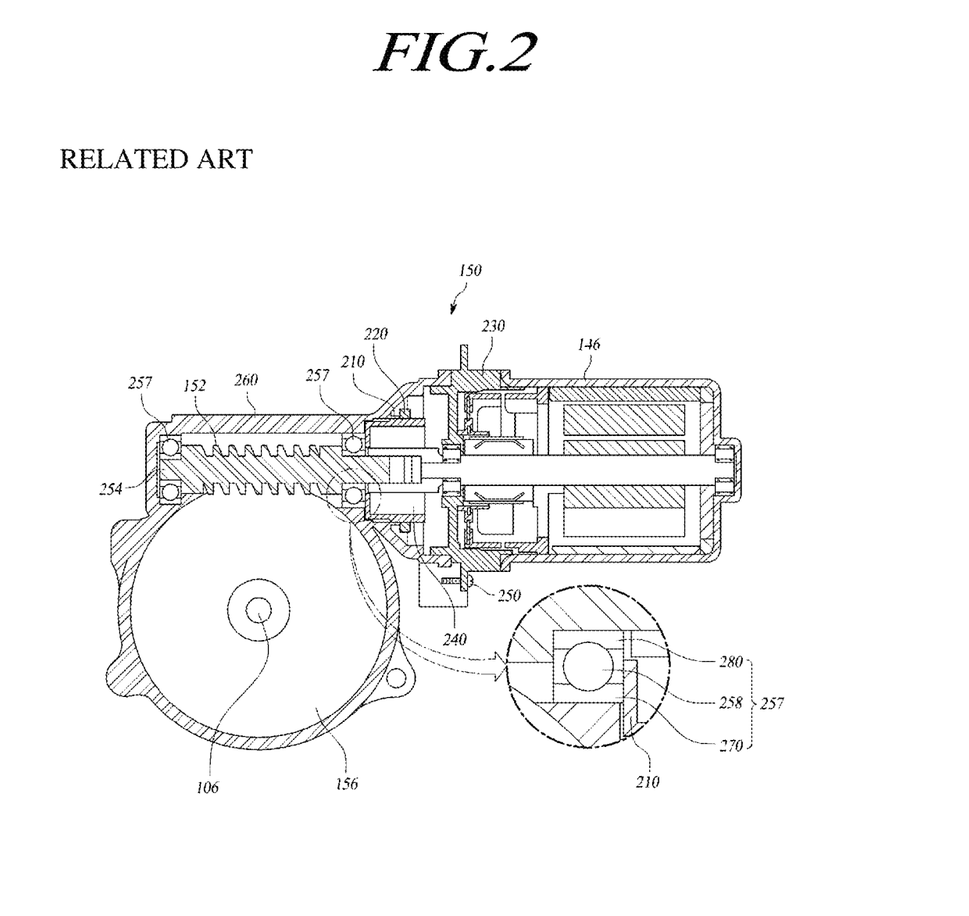
FIG. 2 is a sectional view of a reducer of an electric power steering device.

FIG. 2 is a sectional view of a reducer of an electric power steering device. As illustrated in FIG. 2, the reducer 150 has a worm shaft 254 on which a worm 152 is formed. Worm shaft bearings 257 are installed on both ends of the worm shaft 254, respectively, so as to support the worm shaft 254. A plug bolt 210 is fastened between a damping coupler 240 and the worm shaft bearings 257 in order to prevent generation of a clearance by the worm shaft bearing 257 in the axial direction of the worm shaft 254. The plug bolt 210 is fixed by a plug nut 220.

The worm shaft 254 is connected to the motor 146 via the damping coupler 240 such that the worm shaft 254 is rotated by driving of the motor 146.

A worm wheel 156 is provided on one side of the outer diameter of the worm 152 so as to mesh with the worm 152 formed on the worm shaft 254. The worm wheel 156 is mounted on a steering shaft 106, which transfers the rotational force of the steering wheel 102 operated by the driver, such that the rotational force of the worm shaft 254, which results from driving of the motor 146, is transferred to the steering shaft 106.

A gear housing 260 contains the worm 152, the worm wheel 156, and the like. A motor 146 is provided on one side of the gear housing 260 so as to provide the worm shaft 254 with driving force. The gear housing 260 and the motor 146 are coupled by a motor cover 230 using a bolt 250.

Each worm shaft bearing 257 has a ball 258 coupled between an inner race 280 and an outer race 270 so as to support the rotation of the worm shaft 254, which is connected to the motor 150, at an end portion of the gear housing 260.

The reducer of an electronic power steering device according to the present embodiments has a support member filled with a viscoelastic fluid. The support member is coupled to the inner peripheral surface of the gear housing so as to support the outer race of the worm shaft bearing toward the worm wheel. Accordingly, any clearance resulting from wear of the worm and the worm wheel is prevented, rattle noise resulting from impacts transferred from the road surface is reduced, and the amount of change of clearance resulting from a change in rotational torque is minimized, thereby accurately assisting the driver's steering wheel operating force.

Figure 3:
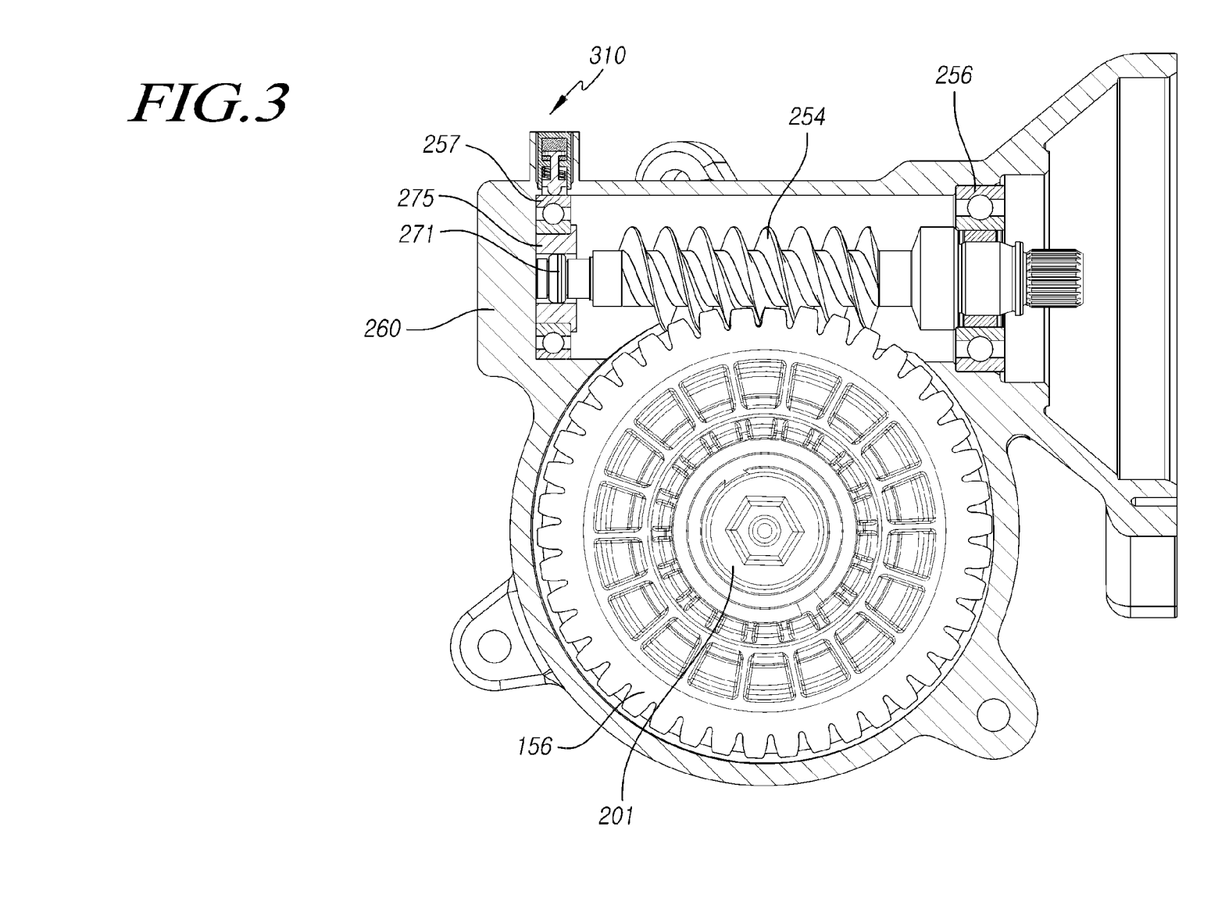
FIG. 3 and FIG. 4 are sectional views of a reducer of an electric power steering device according to the present embodiments.
Figure 4:
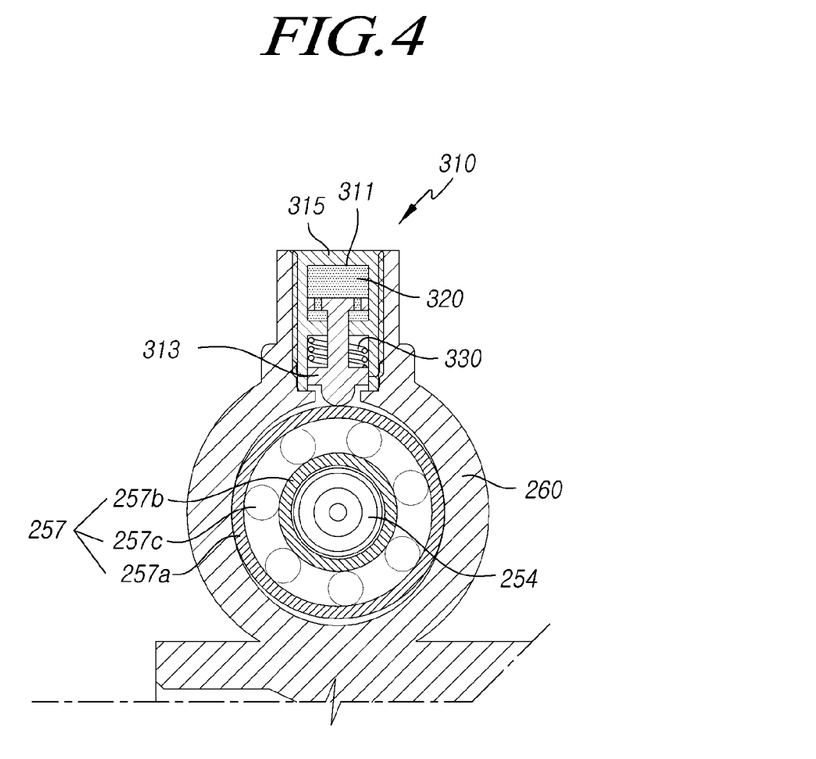
Figure 5:
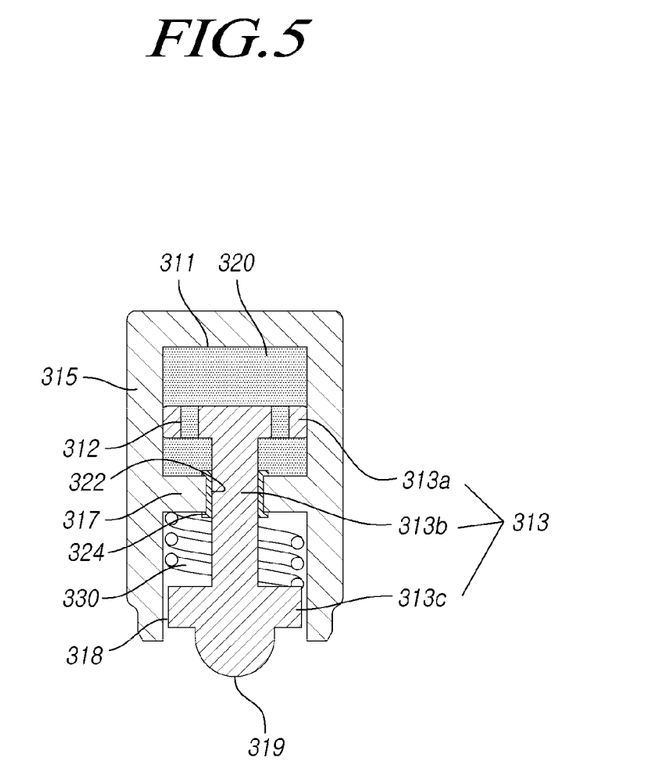
FIG. 5 to FIG. 7 are sectional views of parts of a reducer of an electric power steering device according to the present embodiments.
Figure 6:
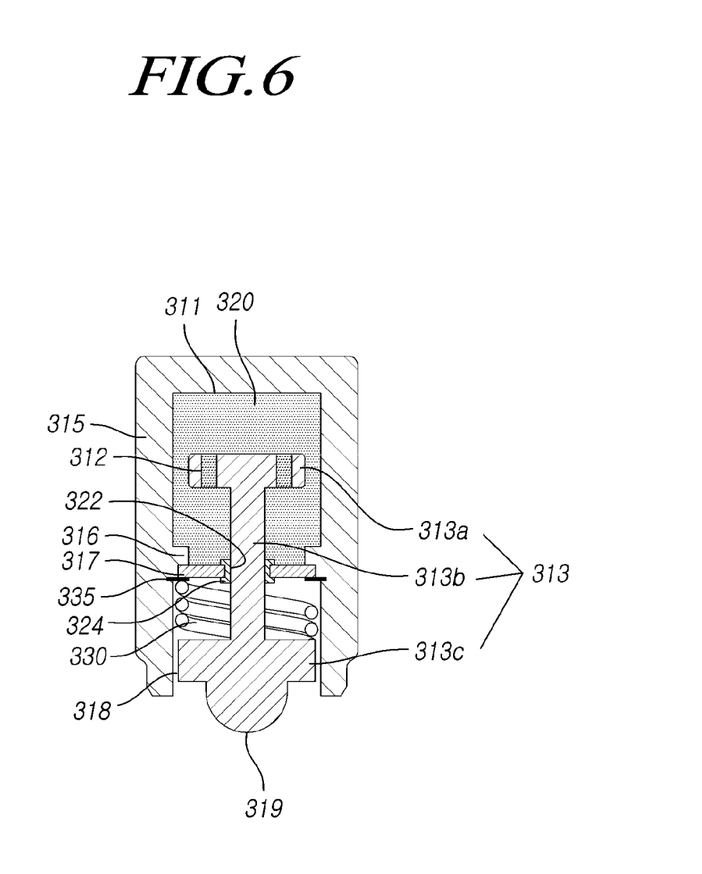
Figure 7:
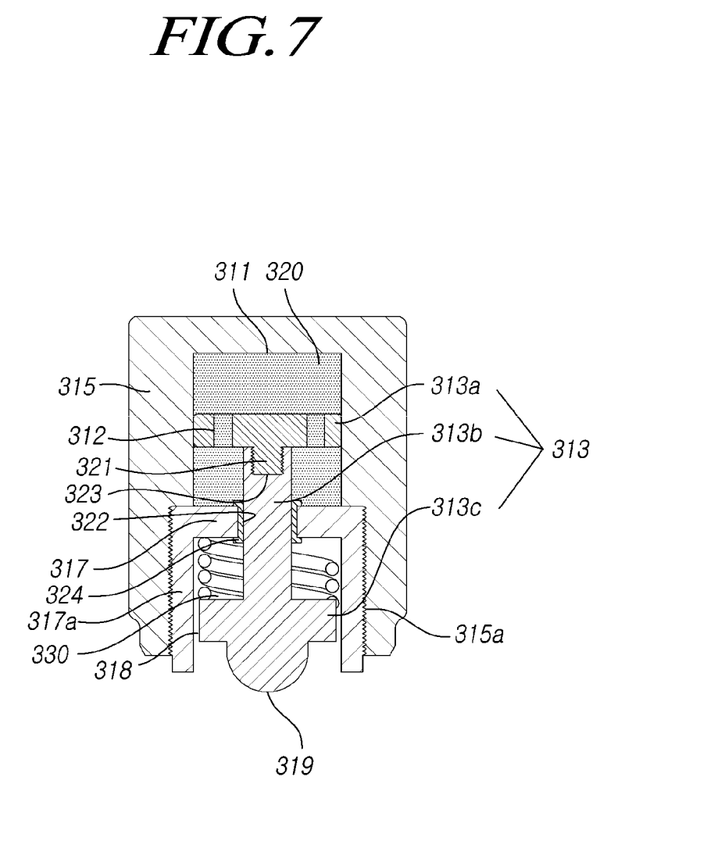

FIG. 3 and FIG. 4 are sectional views of a reducer of an electric power steering device according to the present embodiments. FIG. 5 to FIG. 7 are sectional views of parts of a reducer of an electric power steering device according to the present embodiments.

As illustrated in these drawings, the reducer of an electric power steering device according to the present embodiments includes: a worm shaft 254 having a first worm shaft bearing 256 and a second worm shaft bearing 257 coupled to one end portion, which is connected to the motor shaft, and to the other end portion, which is opposite thereto, respectively; a gear housing 260 that contains the first worm shaft bearing 256, the second worm shaft bearing 257, and the worm shaft 254; and a support member 310 coupled to the gear housing 260 so as to support the second worm shaft bearing 257 toward the worm wheel 156, the support member 310 being filled with a viscoelastic fluid 320.

The reducer operates as follows: the worm shaft 254 and the worm wheel 156 interwork by means of driving force of the motor 146 and rotate the steering shaft 201, thereby assisting the driver's steering force. A first worm shaft bearing 256 and a second worm shaft bearing 257 are fastened to one end portion and the other end portion, which is opposite thereto, of the worm shaft 254, respectively, which interworks with the motor shaft during driving of the motor (see reference numeral 146 in FIG. 2), thereby supporting the rotation of the worm shaft 254.

The worm wheel 156, which interworks with the steering shaft 201, and the worm shaft 254 are contained in the gear housing 260 together with the first worm shaft bearing 256, the second worm shaft bearing 257, and the like.

The second worm shaft bearing 257 includes an inner race 257b coupled to an end of the worm shaft 254, a ball 257c, and an outer race 257a. A support member 310 is coupled to the inner peripheral surface of the gear housing 260 so as to support the outer race 257a of the second worm shaft bearing 257 toward the worm wheel 156. The support member 310 is filled with a viscoelastic fluid 320.

An elastic ring 271 and a bush 275 may be coupled between the inner race 257b of the second worm shaft bearing 257 and an end of the worm shaft 254.

In this regard, the support member 310 largely includes a cylinder member 315 coupled to the gear housing 260 and a piston member 313 inserted into the cylinder member 315 to be able to slide.

The cylinder member 315 has a barrier 317 provided on the inner peripheral surface thereof so as to form a filled portion 311 that is filled with a viscoelastic fluid 320. The piston member 313 includes a head portion 313a positioned inside the filled portion 311 so as to slide and a rod portion 313b that penetrates and is coupled to a through-hole 322 formed in the barrier 317 of the cylinder member 315.

The cylinder member 315 is press-fit and coupled to the gear housing 260. Alternatively, a screw portion may be formed on the outer peripheral surface of the cylinder member 315 and may be screw-coupled to a screw portion formed on the inner peripheral surface of the gear housing 260.

The head portion 313a has a flow hole 312 formed to penetrate one side surface and the other side surface thereof such that, when the piston member 313 slides, the viscoelastic fluid 320 can flow to one side and the other side of the piston through the flow hole 312.

In this case, the viscoelastic fluid 320 exhibits the characteristics of a liquid, a solid, a viscous body, or an elastic body depending on the magnitude of the transferred load and the time.

Therefore, when an impact is transferred from the road surface, the viscoelastic fluid 320 instantly condenses and functions as an elastic body having an elastic module substantially larger than that of the elastic body 330. The viscoelastic fluid 320 then absorbs the impact with no movement of the piston member 313. When a clearance with the worm shaft 254 is generated by wear of the worm wheel 156 or by absorption of moisture by the worm wheel 156, the viscoelastic fluid 320 functions as a viscous body and moves slowly through the flow hole 312 such that the piston member 313 can move toward or away from the worm wheel 156.

A sealing member 324 is coupled to the through-hole 322 of the barrier 317 and is forced against/supported on the outer peripheral surface of the rod portion 313b such that, when the piston member 313 moves, the viscoelastic fluid 320 is prevented from leaking to the outside.

A support plate 313c is formed on the other end portion of the rod portion 313b, that is, on the end portion opposite the head portion 313a, in the diameter direction at a location spaced from an end portion 319 such that an elastic body 330 can be coupled between the barrier 317 and the support plate 313c.

Such coupling of the viscoelastic fluid 320 and the separate elastic body 330 guarantees that, when the worm wheel 156 is worn off or absorbs moisture and expands, the end portion 319 of the rod portion 313b can support the second worm shaft bearing 257 with a constant load through compression and relaxation of the elastic body 330.

A gap 318 is formed between the outer peripheral surface of the support plate 313c and the inner peripheral surface of the cylinder member 315 so as to reduce friction when the cylinder member 315 moves and to prevent generation of a vacuum between the barrier 317 and the support plate 313c.

Meanwhile, the barrier 317 provided on the inner peripheral surface of the cylinder member 315 may be integrally formed on the inner peripheral surface of the cylinder member 315 as illustrated in FIG. 3, FIG. 4, and FIG. 5. Alternatively, the barrier 317 may be supported on a stepped portion 316 formed on the inner peripheral surface of the cylinder member 315 and coupled and retained by a retaining ring 335.

When the inner peripheral surface of the cylinder member 315 and the barrier 317 are formed integrally as illustrated in FIG. 3, FIG. 4, and FIG. 5, two separate cylinder members 315 may be provided, in order to be assembled with the piston member 313, as illustrated in the sectional view of FIG. 5, and may be coupled after the piston member 313 is assembled.

When the barrier 317 is formed separately and retained by a retaining ring 335 on the stepped portion 316 of the cylinder member 315 as illustrated in FIG. 6, the cylinder member 315 may be formed integrally, and the piston member 313 may be coupled by the retaining ring 335.

As illustrated in FIG. 7, the barrier 317 may be formed in the shape of a cylinder, one side of which is open, may have a screw portion formed on the outer peripheral surface of the cylinder portion 317a, and may be screw-coupled to the cylinder member 315. In this case, the cylinder member 315 has an enlarged-diameter portion 315a formed on the inner peripheral surface thereof with an enlarged diameter, and a screw portion is formed on the inner peripheral surface of the enlarged-diameter portion 315a.

As illustrated in FIG. 7, furthermore, the head portion 313a and the rod portion 313b may be separately formed and then coupled to each other. In this case, a fastening protrusion 321 may be formed on one side surface of the head portion 313a, a fastening groove 323 may be formed on an end portion of the rod portion 313b, and the fastening protrusion 321 of the head portion 313a and the fastening groove 323 of the rod portion 313b may be press-fit or screw-coupled to each other.

The present embodiments, which have the above-mentioned shape and structure, are advantageous in that, in connection with a reducer of an electronic power steering device, any clearance resulting from wear of the worm and the worm wheel or resulting from absorption of moisture by the worm wheel is prevented, rattle noise resulting from impacts transferred from the road surface is reduced, and the amount of change of clearance resulting from a change in rotational torque is minimized, thereby accurately assisting the driver's steering wheel operating force.

Even if it was described above that all of the components of an embodiment of the present embodiments are coupled as a single unit or coupled to be operated as a single unit, the present embodiments is not necessarily limited to such an embodiment. That is, at least two elements of all structural elements may be selectively joined and operate without departing from the scope of the present embodiments.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present embodiments expressly defines them so.

Although a preferred embodiment of the present embodiments has been described for illustrative purposes, those skilled in the art will appreciate that various modifications, additions and substitutions are possible, without departing from the scope and spirit of the invention as disclosed in the accompanying claims. Therefore, the embodiments disclosed in the present embodiments are intended to illustrate the scope of the technical idea of the present embodiments, and the scope of the present embodiments is not limited by the embodiment. The scope of the present embodiments shall be construed on the basis of the accompanying claims in such a manner that all of the technical ideas included within the scope equivalent to the claims belong to the present embodiments.

What is claimed is:

1. A reducer of an electric power steering device, comprising:
    a worm shaft having a first worm shaft bearing coupled to one end portion of the worm shaft and a second worm shaft bearing coupled to an other end portion of the worm shaft;

a gear housing that contains the first worm shaft bearing, the second worm shaft bearing, and the worm shaft; and a support member coupled to the gear housing so as to support the second worm shaft bearing toward a worm wheel and filled with a viscoelastic fluid, wherein the support member comprises:

a cylinder member having a barrier provided on an inner peripheral surface so as to form a filled portion that is filled with the viscoelastic fluid; and a piston member, wherein one end portion of the piston member contacts the second worm shaft bearing and an other end portion of the piston member is disposed in the filled portion filled with the viscoelastic fluid, wherein an elastic body is disposed between the one end portion of the piston member contacting the second worm shaft bearing and the other end portion of the piston member disposed in the filled portion filled with the viscoelastic fluid, and wherein a support plate formed at the one end portion of the piston member contacting the second worm shaft bearing supports the elastic body, and an outer peripheral surface of the support plate formed at the one end portion of the piston member contacting the second worm shaft bearing is spaced apart from the inner surface of the cylinder member.

2. The reducer of an electric power steering device of claim 1, wherein the piston member comprises:

a rod portion formed to penetrate and to be coupled to a through-hole formed in the barrier of the cylinder member; and a head portion formed on one end portion of the rod portion so as to be positioned inside the filled portion and to slide.

3. The reducer of an electric power steering device of claim 2, wherein the cylinder member is press-fit and coupled to the gear housing.

4. The reducer of an electric power steering device of claim 2, wherein the cylinder member has a screw portion formed on an outer peripheral surface and is screw-coupled to a screw portion formed on the gear housing.

5. The reducer of an electric power steering device of claim 2, wherein the head portion has a flow hole formed to penetrate one side surface and the other side surface such that, when the piston member slides, the viscoelastic fluid can flow.

6. The reducer of an electric power steering device of claim 2, wherein a sealing member is coupled to the through-hole of the barrier and is sealed against an outer peripheral surface of the rod portion.

7. The reducer of an electric power steering device of claim 1, wherein the barrier is integrally formed on the inner peripheral surface of the cylinder member.

8. The reducer of an electric power steering device of claim 1, wherein the barrier is supported on a stepped portion formed on the inner peripheral surface of the cylinder member and is coupled by a retaining ring.

9. The reducer of an electric power steering device of claim 1, wherein the barrier has the shape of a cylinder, one side of which is open, has a screw portion formed on an outer peripheral surface, and is screw-coupled to a screw portion on an inner peripheral surface of an enlarged-diameter portion formed on the inner peripheral surface of the cylinder member with an enlarged diameter.

10. The reducer of an electric power steering device of claim 9, wherein a fastening protrusion is formed on one side surface of the head portion, a fastening groove is formed on an end portion of the rod portion, and the fastening protrusion and the fastening groove are screw-coupled.

11. The reducer of the electric power steering device of claim 1, wherein the elastic body is supported by the barrier provided on the inner peripheral surface of the cylinder member and the support plate formed at the one end portion of the piston member contacting the second worm shaft bearing.

* * * * *